United States Patent [19]
Seki et al.

[11] Patent Number: 6,029,014
[45] Date of Patent: Feb. 22, 2000

[54] LIGHT MEASURING APPARATUS AND CAMERA USING THE LIGHT MEASURING APPARATUS

[75] Inventors: Yoichi Seki; Shinichi Endo, both of Yotsukaido, Japan

[73] Assignee: Seiko Precision Inc., Japan

[21] Appl. No.: 09/219,998

[22] Filed: Dec. 23, 1998

[30] Foreign Application Priority Data

Dec. 25, 1997 [JP] Japan .................................... 9-357204

[51] Int. Cl.[7] .............................. G03B 15/03; G01J 1/00
[52] U.S. Cl. ......................... 396/165; 396/206; 356/218; 250/214 P
[58] Field of Search ..................................... 396/165, 155, 396/205, 206, 201–204; 356/218, 213, 229; 250/214 P

[56] References Cited

U.S. PATENT DOCUMENTS 4,460,264  7/1984  Winter ..................................... 396/165

*Primary Examiner*—W. B. Perkey
*Attorney, Agent, or Firm*—Adams & Wilks

[57] ABSTRACT

A light measuring apparatus comprises an oscillation circuit, a first delaying circuit for delaying an output waveform of the oscillation circuit in accordance with a peripheral brightness, a second delaying circuit for delaying an output waveform of the oscillation circuit for a predetermined period of time, and a brightness judging circuit for judging a peripheral brightness in accordance with outputs of the first and second delaying circuits.

13 Claims, 3 Drawing Sheets

LIGHT MEASURING APPARATUS AND CAMERA USING THE LIGHT MEASURING APPARATUS

BACKGROUND OF THE INVENTION

1. Field of the Invention

The present invention relates to a light measuring apparatus and to a camera using the light measuring apparatus and, more particularly, to a light measuring apparatus for use in an inexpensive camera in which a film is manually wound by manually rotating a dial (hereinafter referred to as a "low end camera").

2. Background Information

Some conventional low end cameras on the market today do not have a function of detecting brightness. As a result, photographs obtained from such low end cameras often are dark due a low peripheral brightness during a photographing operation.

Other conventional low end cameras have a strobe for emitting light when the peripheral brightness is low during a photographing operation. The structure of this conventional low end camera is such that a charge of the strobe is started by pressing a strobe charging switch separately provided from a release switch. Here, whether or not a flash of the strobe is utilized is left up to the judgment of the photographer. Thus, in the case of the photographer having little experience, there is the possibility that the strobe charging switch is not pressed and the strobe is, therefore, not used even when the peripheral brightness is low, thereby resulting in dark pictures. On the other hand, the strobe may be unnecessarily utilized even when the peripheral brightness is high.

Moreover, conventional low end cameras are required to be operated by a power source having a low voltage and capacity, such as a dry battery (about 1.5 volt), in view of the cost, space and weight constraints associated with such type of cameras.

In conventional cameras which are more expensive than the foregoing conventional low end cameras, a combination of a microcomputer and an analog and digital converter or a comparator is used for judging a brightness. However, the microcomputer requires a power source of at least about 3 volts, and a power source of about 2 volts is required in the case of using a comparator formed of bypolar elements. Furthermore, the microcomputer and the comparator are expensive and are associated with large amounts of current consumption. Thus it becomes impossible to use low capacity power sources, such as a dry battery of about 1 volt, to operate these circuits.

Furthermore, in order to improve the characteristics of the foregoing conventional camera having the brightness judging circuit by preventing changes in temperature and power source voltage, an external memory means, such as an electric erasable programmable read only memory (EEPROM), is used or a temperature compensating circuit is provided. However, such additional structure increases both the cost and the size of the resulting camera.

SUMMARY OF THE INVENTION

It is an object of the present invention to provide a light measuring apparatus for a camera in which an output waveform of an oscillation circuit is delayed in accordance with a peripheral brightness by means of a first delaying circuit, in which an output waveform of the oscillation circuit is delayed for a predetermined time by means of a second delaying circuit, and which judges a peripheral brightness in accordance with outputs of the first and second delaying circuits by means of brightness judging means. By this construction and operation, a microcomputer and a comparator are not required, so that a light measuring apparatus of reduced cost and having low current consumption is achieved.

It is another object of the present invention to provide a light measuring apparatus for a camera in which the oscillation circuit, the first and second delaying circuits and the brightness judging means are formed on the same chip by a complementary metal oxide semiconductor (CMOS) process. By this construction, the light measuring apparatus can be operated at 1 volt or less. Accordingly, when the present invention is embodied in, for example, a low end camera, a reliable operation of the camera can be expected even if a power source having a low voltage and capacity, such as a dry battery of about 1.5 volts, is used.

It is another object of the present invention to provide a light measuring apparatus for a camera in which the first and second delaying circuits comprise a symmetrical circuit. By this construction, the first and second delaying circuits can eliminate changes in a peripheral temperature and voltage, so that operation of the light measuring apparatus becomes stable and there is no need to add a circuit for compensating temperature, such as is required for conventional light measurement apparatuses. This effect becomes more significant by forming the main portions of the light measuring apparatus as an integrated circuit.

It is another object of the present invention to provide a light measuring apparatus for a camera having auxiliary light emitting means for emitting an auxiliary light to a subject to be photographed, first switch means, output means for outputting a timing signal in accordance with an operation of the first switch means, and a charging circuit for charging a power for operating the auxiliary light emitting means in accordance with outputs of the output means and the brightness judging means. By this construction, auxiliary light can be automatically emitted in accordance with the peripheral brightness while reducing the overall manufacturing cost and current consumption as compared to the conventional art.

It is another object of the present invention to provide a light measuring apparatus for a camera in which the first switch means is driven by an operation of second switch means before the film is fed. By this construction, a photographing operation can be performed with an automatic emission of auxiliary light by operation of only the second switch means, thereby improving the operability of the camera.

It is another object of the present invention to provide a light measuring apparatus for a camera having inhibiting means for inhibiting a charging operation of the charging circuit when, for example, the second switch means is not operated during a desired time after the first switch means is operated. By this construction, the continuation of an unnecessary charging operation when the photographer does not intend to perform a photographic operation can be avoided to prevent the wasteful consumption of electric power.

In order to meet the above-described and other objects, a light measuring apparatus according to the present invention comprises an oscillation circuit, a first delaying circuit for delaying an output waveform of the oscillation circuit in accordance with a peripheral brightness, a second delaying circuit for delaying an output waveform of the oscillation circuit for a predetermined amount of time, and brightness judging means for judging a peripheral brightness in accordance with outputs of the first and second delaying circuits.

In another embodiment according to the present invention, the oscillation circuit, the first and second delaying circuits and the brightness judging means are formed on the same chip by a complementary metal oxide semiconductor (CMOS) process.

In another embodiment according to the present invention, the first and second delaying circuits comprise a symmetrical circuit.

According to another aspect of the present invention, a camera having the light measuring apparatus according to any of the foregoing embodiments comprises auxiliary light emitting means for emitting an auxiliary light to a subject to be photographed, first switch means for initiating operation of the auxiliary light emitting means, output means for outputting a timing signal in accordance with an operation of the first switch means, and a charging circuit for charging a power for operating the auxiliary light emitting means in accordance with outputs of the output means and the brightness judging means.

In another embodiment, the camera according to the present invention further comprises a shutter and second switch means for opening and closing the shutter during a photographing operation. The first switch means is preferably driven by an operation of second switch means before a film of the camera is fed during the photographing operation.

In another embodiment according to the present invention, a camera comprises auxiliary light emitting means for irradiating an auxiliary light to a subject to be photographed, first switch means for initiating operation of the auxiliary light emitting means, second switch means for opening and closing a shutter, a charging circuit for charging a power for operating the auxiliary light emitting means in accordance with an operation of the first switch means, and inhibiting means for inhibiting a charging operation of the charging circuit when the second switch means is not operated during a desired time after the first switch means is operated.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings an embodiment which is presently preferred. It should be understood, however, that the invention is not limited to the precise arrangement and instrumentalities shown. In the drawings.

DETAILED DESCRIPTION OF THE PREFERRED EMBODIMENT

While this invention is susceptible of embodiments in many different forms, this specification and the accompanying drawings disclose only a preferred embodiment of the invention. The invention is not intended to be limited to the embodiment so described, and the scope of the invention will be pointed out in the appended claims.

Although the preferred embodiment of the invention is described in connection with low end cameras, the invention described herein has utility in, for example, other more expensive cameras. Therefore, all aspects of the present invention should not only be considered as extending to the type of camera illustrated, but also to other types of cameras.

Figure 4:
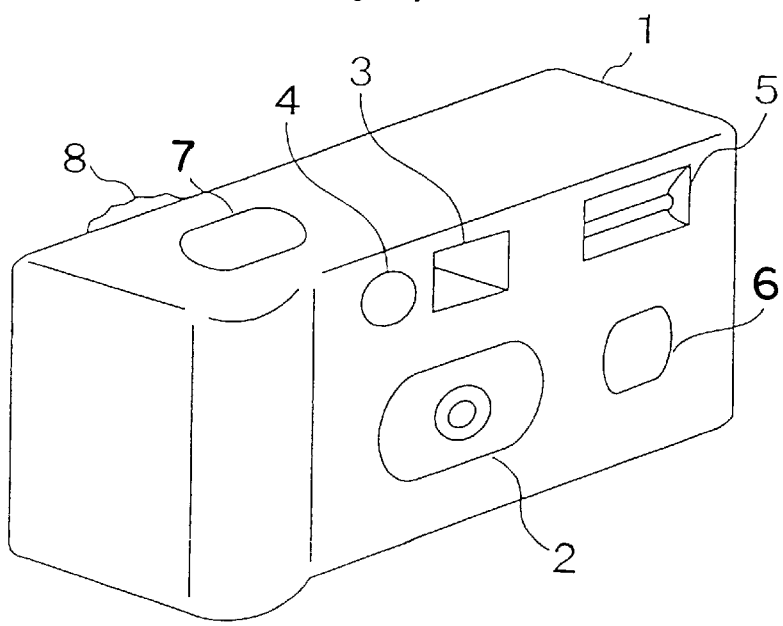
FIG. 4 is a schematic view of the camera according to the present invention.

An outer appearance of the low end camera in accordance with the present invention is shown in FIG. 4. A main body 1 of the camera comprises a casing preferably formed of a plastic material. A photographing lens 2 and a transparent finder 3 are also preferably formed of a plastic material. The photographic lens 2 is preferably designed to be in best focus for a subject to be photographed that is situated about 3 meters from the lens. A rotational dial or knob 8 extends from a rear side of the main body 1 for winding a film of the camera.

Figure 3:
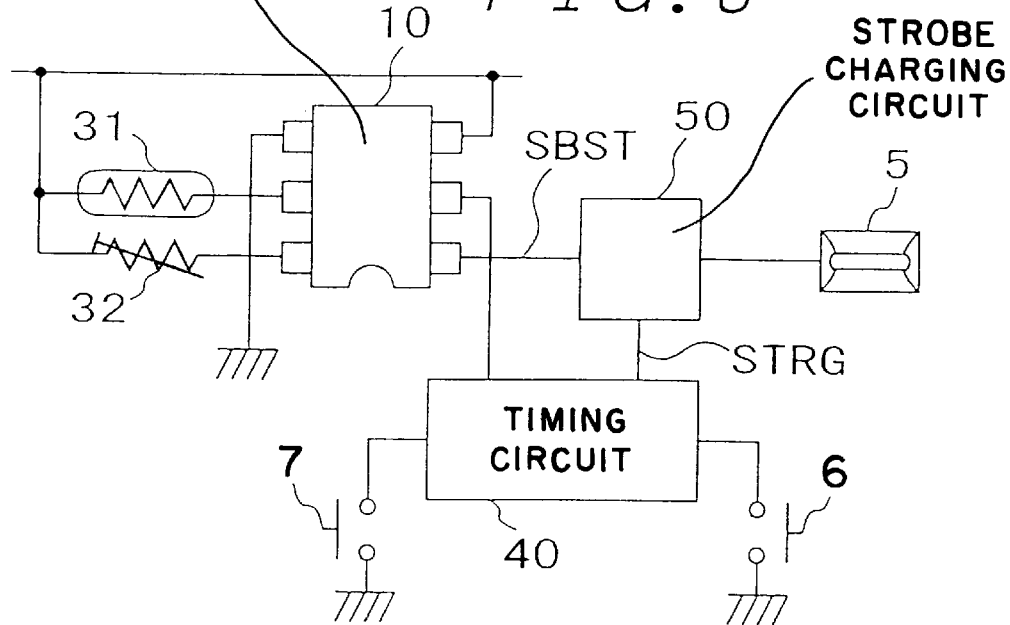
FIG. 3 is a circuit diagram of a camera having the light measuring apparatus according to the present invention.

A light measuring window comprises a plastic transmission window 4. A cadmium sulfide element 31 (hereinafter referred to as CdS), which is shown in the circuit block diagram of FIG. 3, is disposed in the main body 1 behind the plastic transmission window 4 for measuring a peripheral brightness in a direction of the subject to be photographed. An auxiliary light emitting device comprises a strobe 5 for emitting an auxiliary light to the subject. A first switch 6 for initiating operation of the auxiliary light emitting device allows the strobe 5 to emit or inhibit the strobe from emitting auxiliary light to the subject in accordance with the measured peripheral brightness. A second switch 7 corresponds to a release switch for opening and closing a shutter of the camera for exposing a film.

FIG. 3 shows a circuit block diagram of the camera according to the present invention. A light measuring IC (integrated circuit) 10 corresponds to an IC constituting a main portion of the light measuring apparatus of the invention. The CdS element 31 for measuring a peripheral brightness and a reference resistor 32 having a variable reference resistance are externally connected to the light measuring IC 10. In accordance with pressing the first and second switches 6, 7, a timing circuit 40 constituting output means generates a timing output signal for controlling the light measuring IC 10 and a strobe charging circuit 50 for charging a power for operating the strobe 5.

The strobe charging circuit 50 has a large capacity condenser for charging power to or activating the strobe 5 to emit auxiliary light. The structure of the strobe charging circuit 50 is such that it does not charge the condenser when an output BENBL terminal (FIG. 1) of the light measuring IC 10 is in a normal low level (hereinafter referred to as "L"), it charges the condenser only in the case that the BENBL terminal changes to a high level (hereinafter referred to as "H"), and activates the strobe 5 in response to an output signal of the timing circuit 40 in accordance with an operation of the release switch 7.

Figure 2:
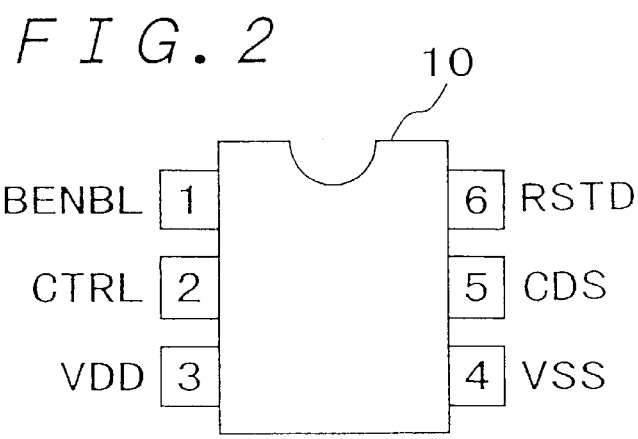
FIG. 2 is a schematic view showing a terminal arrangement of the light measuring IC according to the embodiment of the present invention.

An arrangement of pins in the light measuring IC 10 is shown in FIG. 2. A signal for allowing a charging of the strobe 5 is output from the BENBL terminal of a first pin. A signal for starting or stopping the operation of the light measuring IC 10 is input to a CTRL input or terminal of a second pin. A VDD terminal of a third pin and a VSS terminal of a fourth pin are power source terminals, where the third pin corresponds to a high voltage input and the fourth pin corresponds to a low voltage input. The CdS element 31 and the reference resistor 32 are respectively connected to a CDS terminal of a fifth pin and an RSTD terminal of a sixth pin.

Figure 1:
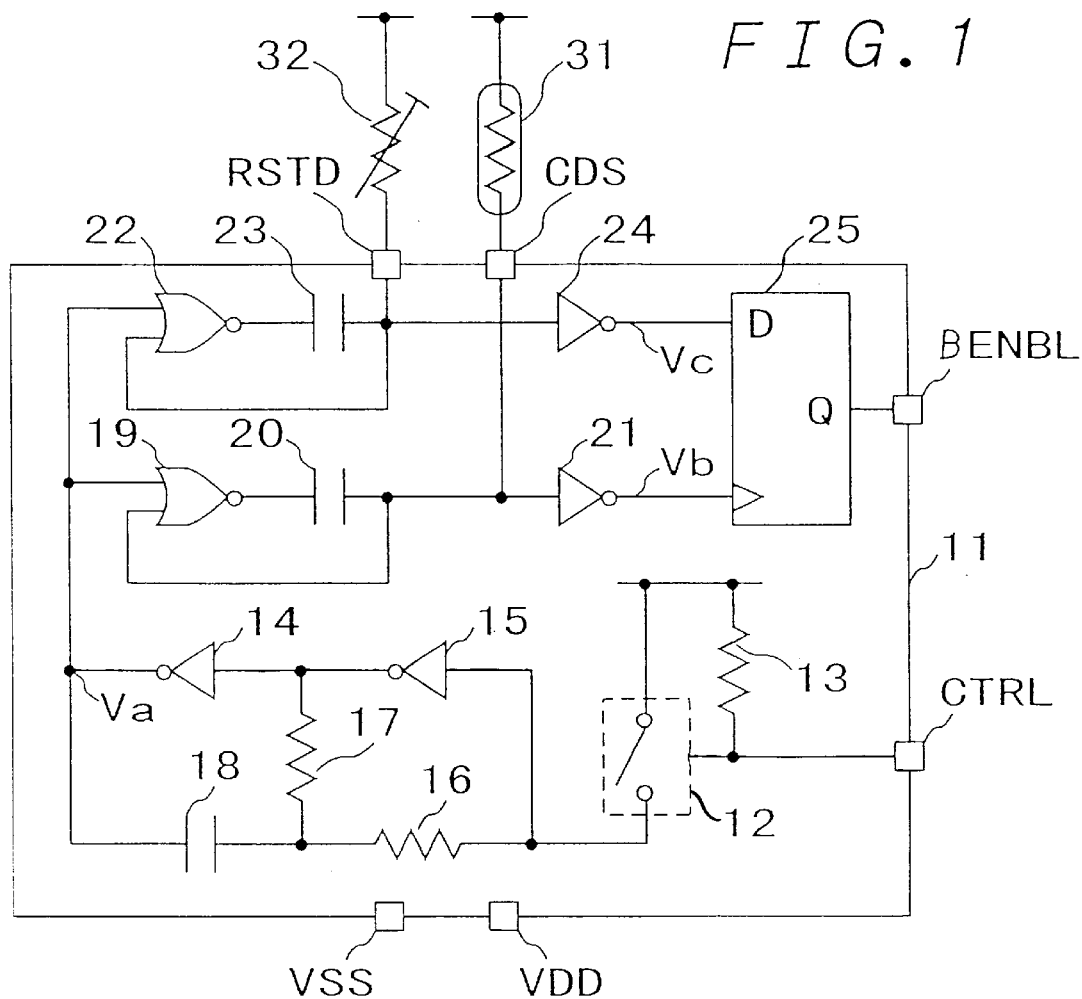
FIG. 1 is a circuit diagram of an inner portion of a light measuring IC of a light measuring apparatus according to an embodiment of the present invention.

A construction of the light measuring IC 10 according to the present invention is shown in FIG. 1. The CTRL terminal controls a semiconductor switch 12. However, the CTRL terminal is generally held in an "H" state by a pull-up resistor 13 so as not to be operated. In this case, when the CTRL terminal becomes "L", the semiconductor switch 12 is turned OFF, and the light measuring IC 10 is operated so as to start a light measuring operation. Inverters 14 and 15, resistors 16 and 17, and a condenser 18 constitute an oscillation circuit, which continuously outputs a square wave having a frequency determined by an electrical characteristic and a temperature characteristic of each of the elements. In this case, when an inexpensive CdS element 31 having a relatively poor quality is used, it is necessary to make the oscillating frequency of the oscillation circuit small, so that in this case, it is preferable to outwardly attach the condenser 18 having a great capacity.

An OR gate 19, a condenser 20 and an inverter 21 constitute a first delaying circuit together with the CdS element 31 outwardly attached to the CDS terminal, and a delaying time thereof is proportional to the product of the resistance value of the CdS element 31 and the capacity of the condenser 20. Since the resistance value of the CdS element 31 is inversely proportional to an amount of light entered into the CdS element 31 itself, the higher the peripheral brightness is, the smaller the delaying time becomes. The changing amount of the resistance value of the CDS terminal within the range of the detected brightness can be adjusted by connecting an appropriate resistance to the CdS 31 in series or in parallel.

An OR gate 22, a condenser 23 and an inverter 24 constitute a second delaying circuit together with the reference resistor 32 outwardly attached to the RSTD terminal, and a delaying time thereof is proportional to the product of the resistance value of the reference resistor 32 and the capacity of the condenser 23. An optimum resistance value of the reference resistor 32 is selected in accordance with a characteristic of the CdS element 31 at a time of manufacturing. Since the circuits except for the CdS element 31 and the reference resistor 32 are formed on a single chip by the CMOS process, they can be operated at a low voltage equal to or lower than 1 volt. For example, when the strobe 5 is charged using a dry battery having 1.5 volts, the power voltage sometimes drops to about 1 to 1.2 volts. However, even at this low voltage, no trouble occurs with the operation of the strobe 5. In this case, even if the condenser 18 having a high capacity is outwardly attached, the circuits except for the condenser 18, the CdS element 31 and the reference resistor 32 can be formed on the single chip by the CMOS process, so that the operation of the light measuring apparatus can be achieved even at a low voltage equal to or lower than 1 volt.

A D latch 25 constitutes brightness judging means for judging a peripheral brightness in accordance with outputs of the first and second delaying circuits as further described below.

An operation of the camera according to the present invention shown in FIG. 3 will be described with reference to FIG. 5. When the first switch 6 is pressed (time Ta), the timing circuit 40 outputs "L" to the CTRL terminal after a time delay T0 for removing chattering of the first switch 6 (time Tb), the internal circuit of the light measuring IC 10 is operated and the square wave voltage waveform Va appears in the output of the oscillation circuit. Thereafter, the voltage waveform Vb having a time delay T1 reflecting the peripheral brightness to the voltage waveform Va is output as an output of the inverter 21, and the voltage waveform Vc having a predetermined time delay T2 to the voltage waveform Va is output as an output of the inverter 24. The D latch 25, constituting the brightness judging means, latches the voltage waveform Vc by a rise trigger of the voltage waveform Vb. The period shown by a wavy line Tc in the drawing from Ta shows a state in which the peripheral brightness is bright. At this time, the resistance value of the CdS element 31 becomes small, and the delaying time of the first delaying circuit becomes short. Accordingly, the BENBL terminal outputting a charge starting signal SBST ("H") keeps "L", so that charging of the condenser of the strobe charging circuit 50 is not performed.

Figure 5:
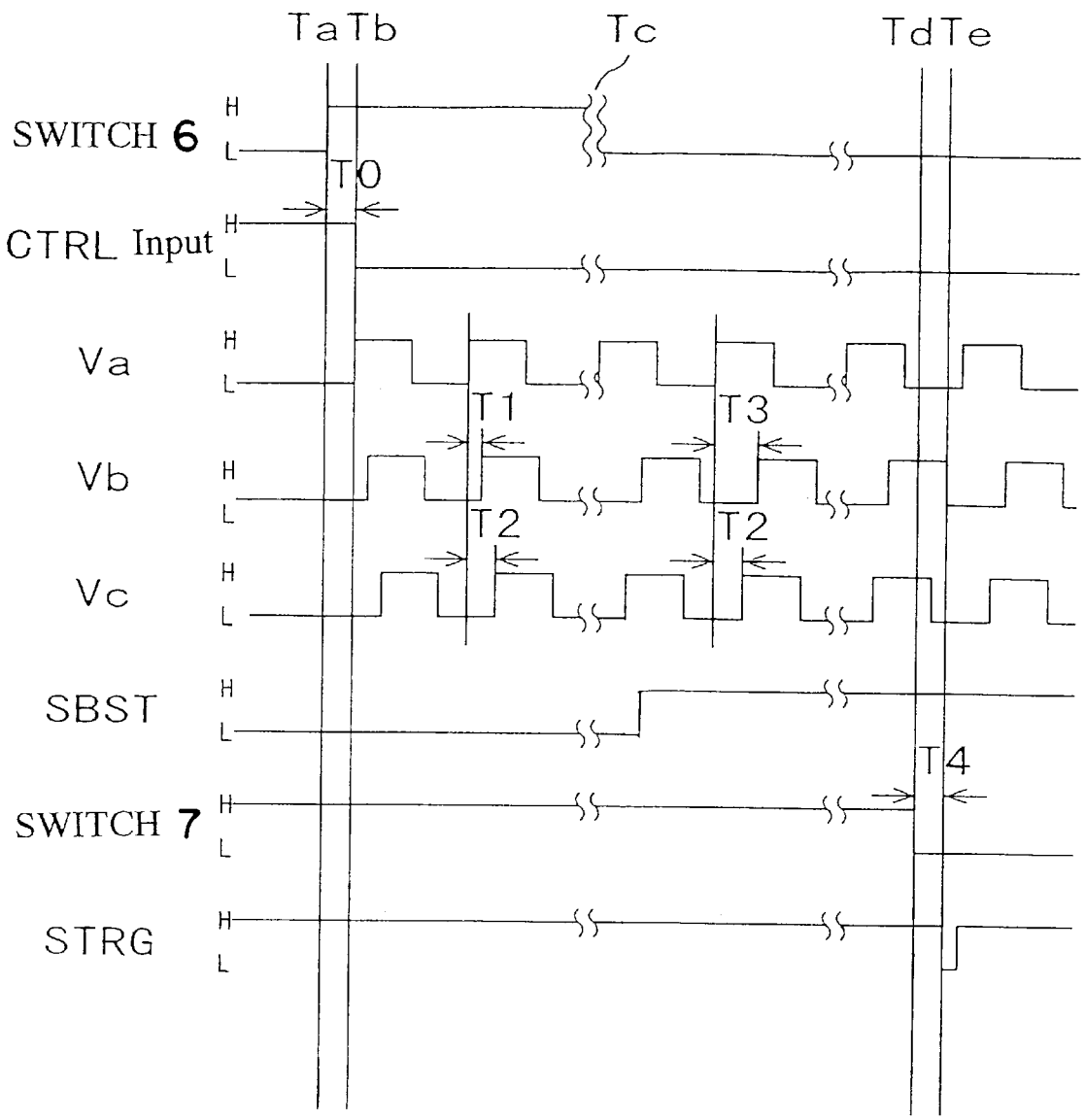
FIG. 5 is a timing chart of the operation of the camera according to the present invention.

In FIG. 5, the state after the wavy line Tc shows the case in which the peripheral brightness is lowered. The peripheral brightness is often lowered when the photographer grips the camera for the purpose of photographing, particularly when the photographer moves to a dark place and when the photographer approaches the subject to be photographed. In this case, since the resistance of the CdS element 31 becomes large, the delaying time of the voltage waveform Vb becomes great from the time T1 to the time T3. In this case, when the voltage waveform Vc is latched at a rise of the voltage waveform Vb in the case that the delaying time by the first delaying circuit becomes greater than the delaying time T2 by the second delaying circuit, the BENBL terminal becomes "H" at this time, so that the charge starting signal SBST ("H") is output and charging of the condenser of the strobe charging circuit 50 is started.

Another reason why the peripheral brightness is lowered in the state after the wavy line Tc, in addition to photographing in a dark place, is that the camera is often placed in a baggage or a pocket. In this case, although the photographer does not intend to perform a photographing operation, there occurs a case in which the charging of the strobe 5 is continued. In order to avoid this, in the case that the second switch 7 is not pressed even when a predetermined time (e.g., 3 minutes) has elapsed since the camera was placed in the dark place, the timing circuit 40 performs an operation of turning OFF the CTRL terminal. By this construction, the timing circuit 40 constitutes inhibiting means for inhibiting a charging operation of the strobe charging circuit 50 when the second switch 7 is not pressed within a given time after the first switch 6 is pressed. Accordingly, wasteful electricity consumption can be restricted. In this case, when the photographer again presses the first switch 6, the series of operations described above can be performed.

As described above, the output of the D latch 25 shows a dimensional relation between the delaying times of the voltage waveforms Vb and Vc by the first and second delaying circuits. When the delaying time of the first delaying circuit becomes greater than the delaying time of the second delaying circuit due to the low peripheral brightness, the output of the D latch 25 becomes "H", meaning that the periphery is dark and the photographing must be performed using the strobe 5, and the charge of the condenser of the strobe charging circuit 50 is started.

During this state, when the photographer pushes the second switch 7 at a time Td after winding a frame of the film by rotating the knob 8, the timing circuit 40 outputs a strobe trigger STRG output to the strobe charging circuit 50 during the time T4 at which time the shutter forms a maximum opening from a down position of the second switch 7, thereby causing the strobe 5 to emit the auxiliary light.

By the foregoing construction of the camera and light measuring apparatus according to the present invention, the following advantages are obtained.

(1) The light measuring apparatus of the present invention can effectively measure light without the use of circuits which increase the overall manufacturing cost and cause large current consumption, such as expensive microcomputers and comparators. Furthermore, an auxiliary light can be automatically emitted in accordance with a peripheral brightness. Accordingly, the present invention provides a light measuring apparatus which can operate at a lower cost and with a lower current consumption than conventional light measuring apparatuses.

(2) Since the timing circuit 40 performs an operation of turning OFF the CTRL terminal when charging of the strobe 5 is continued even though there is no intention to conduct a photographing operation, the wasteful consumption of current is effectively controlled. Furthermore, since the condenser of the strobe charging circuit 50 is not charged without pressing the first switch 6, the photographing operation can continue without pressing the first switch 6 in the case that the peripheral brightness is apparently sufficient.

(3) Since the first and second delaying circuits are symmetrical circuits, changes in the peripheral temperature and voltage can be canceled. The operation of the light measuring apparatus and the camera can therefore be made stable, and it is not necessary to add additional circuits for temperature compensation as is required in the conventional light measuring apparatuses. This effect becomes significant by forming main portions of the light measuring apparatus as an integrated circuit.

(4) Since the first and second delaying circuits and the brightness judging means are formed on the same chip by a complementary metal oxide semiconductor (CMOS) process, the apparatus can be principally operated at a voltage equal to or less than 1 volt. Accordingly, when the present invention is applied to, for example, a low end camera, it is expected that the light measuring apparatus can be operated even by a power source having a low voltage and a low capacity, such as a dry battery of about 1.5 volts.

(5) One embodiment of the camera according to the present invention comprises an oscillation circuit, a first delaying circuit for delaying an output waveform of the oscillation circuit in accordance with a peripheral brightness, a second delaying circuit for delaying an output waveform of the oscillation circuit for a predetermined time, brightness judging means for judging a peripheral brightness in accordance with outputs of the first and second delaying circuits, auxiliary light emitting means for emitting an auxiliary light to a subject, first switch means for initiating operation of the auxiliary light emitting means, output means for outputting a timing signal in accordance with an operation of the first switch means, and a charging circuit for charging a power for operating the auxiliary light emitting means in accordance with outputs of the output means and the brightness judging means. By this construction, the auxiliary light can be automatically emitted to the subject by the auxiliary light emitting means in accordance with the peripheral brightness while achieving lower construction cost and current consumption as compared to the conventional art.

(6) Since the first switch means is driven by an operation of the second switch means before the film is wound during a photographing operation, the photographing operation together with the automatic emission of auxiliary light can be realized only by operating the second switch means, thereby improving the operability of the camera.

(7) The inhibiting means inhibits the charging operation of the charging circuit for starting the charge by the operation of the first switch means in the case that the second switch means is not operated for a desired time after the first switch means is operated. By this operation, unnecessary charging is discontinued when the photographer does not intend to photograph, and the wasteful consumption of power is restricted.

(8) The determination of whether or not the strobe should be emitted can be appropriately judged by a system having a minimum number of circuits, thereby reducing the overall space requirement and cost. Furthermore, the reliability of the circuits can be increased by forming an integrated circuit.

From the foregoing description, it can be seen that the present invention comprises an improved light measuring apparatus and an improved camera using the light measuring apparatus. It will be appreciated by those skilled in the art that obvious changes can be made to the embodiments described in the foregoing description without departing from the broad inventive concept thereof. For example, although the preferred embodiment of the invention is described in connection with low end cameras, the invention described herein has utility in, for example, other more expensive cameras. Therefore, all aspects of the present invention should not only be considered as extending to the type of camera illustrated, but also to other types of cameras.

In the embodiment described in the foregoing description, the first switch 6 and the second switch 7 are formed as separate switches. However, when the structure of the camera is such that the operation of the first switch 6 is performed before the film is wound by the knob 8 by pressing the second switch 7, the object of the present invention can be realized using only one switch.

The oscillation circuit of the embodiment described in the foregoing description may be replaced by an oscillation circuit using a quartz vibrator. In this case, since the consumption current becomes about 1 to 2 micro amperes, the light measuring IC 10 may be always operated, so that the circuit can be further simplified.

In the embodiment of the camera described in the foregoing description, a release button switch is used as a trigger for activating the strobe. Alternatively, it is possible to use a member moving together with opening and closing of the shutter in place of the release button switch, or to use a sensor mechanically and optically sensing opening and closing of the shutter.

Moreover, display means such as an LED for displaying a state in which the first switch 6 has been pressed and the light measuring IC 10 is operated may be provided in the camera according to the present invention.

From the foregoing description, it is understood, therefore, that this invention is not limited to the particular embodiments disclosed, but is intended to cover all obvious modifications thereof which are within the scope and the spirit of the invention as defined by the appended claims.

We claim:

1. A light measuring apparatus comprising: an oscillation circuit; a first delaying circuit for delaying an output waveform of the oscillation circuit in accordance with a peripheral brightness; a second delaying circuit for delaying an output waveform of the oscillation circuit for a predetermined period of time; and brightness judging means for judging a peripheral brightness in accordance with outputs of the first and second delaying circuits.

2. A light measuring apparatus according to claim 1; wherein the oscillation circuit, the first and second delaying circuits and the brightness judging means comprise a complementary metal oxide semiconductor structure.

3. A light measuring apparatus according to claim 1; wherein the first and second delaying circuits comprise a symmetrical circuit.

4. A camera comprising:

a light measuring apparatus having an oscillation circuit, a first delaying circuit for delaying an output waveform of the oscillation circuit in accordance with a peripheral brightness, a second delaying circuit for delaying an output waveform of the oscillation circuit for a predetermined period of time, and brightness judging means for judging a peripheral brightness in accordance with outputs of the first and second delaying circuits;

auxiliary light emitting means for emitting an auxiliary light to a subject to be photographed;

switch means for initiating operation of the auxiliary light emitting means;

output means for outputting a timing signal in accordance with an operation of the switch means; and a charging circuit for charging a power for operating the auxiliary light emitting means in accordance with outputs of the brightness judging means and the output means.

5. A camera according to claim 4; wherein the oscillation circuit, the first and second delaying circuits and the brightness judging means of the light measuring apparatus comprise a complementary metal oxide semiconductor structure.

6. A camera according to claim 4; wherein the first and second delaying circuits of the light measuring apparatus comprise a symmetrical circuit.

7. A camera according to claim 4; wherein the switch means for initiating operation of the auxiliary light emitting means comprises first switch means; and further comprising a shutter; and second switch means for opening and closing the shutter during a photographing operation to expose a film, the first switch means being activated by operation of the second switch means before the film is wound during the photographing operation.

8. A camera comprising: auxiliary light emitting means for irradiating an auxiliary light to a subject to be photographed; first switch means for initiating operation of the auxiliary light emitting means; a shutter; second switch means for controlling the opening and closing the shutter; a charging circuit for charging a power for operating the auxiliary light emitting means in accordance with an operation of the first switch means; and inhibiting means for inhibiting a charging operation of the charging circuit when the second switch means is not operated within a given time after the first switch means is operated.

9. A camera according to claim 8; further comprising output means for outputting a timing signal in accordance with an operation of the first switch means; and a light measuring apparatus having an oscillation circuit, a first delaying circuit for delaying an output waveform of the oscillation circuit in accordance with a peripheral brightness, a second delaying circuit for delaying an output waveform of the oscillation circuit for a predetermined period of time, and brightness judging means for judging a peripheral brightness in accordance with outputs of the first and second delaying circuits; wherein the charging circuit charges a power for operating the auxiliary light emitting means in accordance with outputs of the brightness judging means and the output means.

10. A camera according to claim 9; wherein the oscillation circuit, the first and second delaying circuits and the brightness judging means of the light measuring apparatus comprise a complementary metal oxide semiconductor structure.

11. A camera according to claim 9; wherein the first and second delaying circuits of the light measuring apparatus comprise a symmetrical circuit.

12. A camera according to claim 9; wherein the first switch means is activated by operation of the second switch means before the film is wound during the photographing operation.

13. A camera according to claim 8; wherein the first switch means is activated by operation of the second switch means before the film is wound during the photographing operation.

* * * * *